United States Patent
Phan et al.

(10) Patent No.: US 10,917,677 B2
(45) Date of Patent: *Feb. 9, 2021

(54) GEO, SEGMENT, UNIQUES DISTRIBUTED COMPUTING SYSTEM

(71) Applicant: Oath Inc., New York, NY (US)

(72) Inventors: Giao Huu Phan, San Francisco, CA (US); Daniel Wei-Tze Hsiung, San Francisco, CA (US); Ian Graeme Melven, San Francisco, CA (US); Brian Hardie, San Francisco, CA (US); Joseph Gutierrez, San Francisco, CA (US); Marshall Allen Beddoe, San Francisco, CA (US); Pankaj Gupta, San Francisco, CA (US); Bernardo de Seabra, San Francisco, CA (US); Dru Nelson, San Carlos, CA (US); Kam Ho Kenneth Cheung, San Francisco, CA (US); Jason Endo, San Francisco, CA (US); Max Sadrieh, San Francisco, CA (US); Rahul Ravindran, San Francisco, CA (US); Vikas Unnava, San Francisco, CA (US); Sharon Paisner, San Francisco, CA (US); Dia Kharrat, San Francisco, CA (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,825

(22) Filed: Sep. 17, 2018

(65) Prior Publication Data
US 2019/0020930 A1 Jan. 17, 2019

Related U.S. Application Data

(63) Continuation of application No. 14/214,547, filed on Mar. 14, 2014, now Pat. No. 10,080,064.
(Continued)

(51) Int. Cl.
*H04N 21/24* (2011.01)
*H04N 21/81* (2011.01)
(Continued)

(52) U.S. Cl.
CPC ....... *H04N 21/2405* (2013.01); *G06F 9/5083* (2013.01); *G06Q 30/02* (2013.01);
(Continued)

(58) Field of Classification Search
CPC ............ H04N 21/812; H04N 21/2547; H04N 21/1097; H04N 21/8456; H04N 21/2668; G06Q 30/02
See application file for complete search history.

(56) References Cited

U.S. PATENT DOCUMENTS 6,341,371 B1 * 1/2002 Tandri ................... G06F 8/452
712/200
8,346,516 B2 * 1/2013 Misra .................. G06Q 10/00
703/2
(Continued)

*Primary Examiner* — Ricky Chin
(74) *Attorney, Agent, or Firm* — Cooper Legal Group, LLC

(57) ABSTRACT

A distributed computing system is configured to compute operational data for a video advertisement delivery system. Cloud-based resource are used to calculate operational parameters such as geographical data, unique advertisement delivery instances and segments of consumers that received the video advertisements.

20 Claims, 6 Drawing Sheets

Related U.S. Application Data

(60) Provisional application No. 61/801,712, filed on Mar. 15, 2013.

(51) Int. Cl.
    *H04N 21/2547*     (2011.01)
    *H04L 29/08*     (2006.01)
    *H04N 21/845*     (2011.01)
    *G06Q 30/02*     (2012.01)
    *H04N 21/231*     (2011.01)
    *G06F 9/50*     (2006.01)
    *H04N 21/2668*     (2011.01)

(52) U.S. Cl.
    CPC .... *H04L 29/08144* (2013.01); *H04L 67/1097* (2013.01); *H04N 21/23103* (2013.01); *H04N 21/2547* (2013.01); *H04N 21/2668* (2013.01); *H04N 21/812* (2013.01); *H04N 21/8456* (2013.01)

(56) References Cited

U.S. PATENT DOCUMENTS

| | | | |
|---|---|---|---|
| 9,128,747 B2* | 9/2015 | Rajaraman | G06F 8/456 |
| 9,489,283 B1* | 11/2016 | Popovici | G06F 11/3636 |
| 2002/0083445 A1* | 6/2002 | Flickinger | G06Q 30/02 |
| | | | 725/35 |
| 2005/0097088 A1* | 5/2005 | Bennett | G06Q 30/00 |
| 2009/0100410 A1* | 4/2009 | Pouliot | G06F 8/75 |
| | | | 717/122 |
| 2011/0276945 A1* | 11/2011 | Chasman | G06F 8/71 |
| | | | 717/124 |
| 2012/0060165 A1* | 3/2012 | Clarke | G06F 9/5038 |
| | | | 718/104 |
| 2012/0266181 A1* | 10/2012 | Carney | H04L 45/60 |
| | | | 718/105 |
| 2013/0067512 A1* | 3/2013 | Dion | G06Q 30/02 |
| | | | 725/34 |
| 2013/0185705 A1* | 7/2013 | Kuesel | G06F 8/443 |
| | | | 717/152 |
| 2013/0194505 A1* | 8/2013 | Pahalawatta | H04N 5/21 |
| | | | 348/607 |
| 2014/0007132 A1* | 1/2014 | Gaxiola | G06F 9/5083 |
| | | | 718/105 |
| 2014/0019964 A1* | 1/2014 | Neuse | G06F 9/45558 |
| | | | 718/1 |
| 2014/0040666 A1* | 2/2014 | Goetz | G06F 11/3688 |
| | | | 714/32 |
| 2014/0257780 A1* | 9/2014 | Jing | G01V 99/005 |
| | | | 703/6 |
| 2016/0124652 A1* | 5/2016 | Adamson | G06F 12/0871 |
| | | | 711/171 |

* cited by examiner

GEO, SEGMENT, UNIQUES DISTRIBUTED COMPUTING SYSTEM

CROSS REFERENCE TO RELATED APPLICATIONS

This application claims priority to and is a continuation of U.S. application Ser. No. 14/214,547, filed on Mar. 14, 2014, entitled "GEO, SEGMENT, UNIQUES DISTRIBUTED COMPUTING SYSTEM", which claimed priority to U.S. Provisional Patent Application No. 61/801,712, filed on Mar. 15, 2013, both of which are incorporated herein.

TECHNICAL FIELD

The present document generally relates to digital video advertisement insertion.

BACKGROUND

Many companies seek to attract customers by promoting their products or services as widely as possible. Online video advertising is a form of promotion that uses the Internet and World Wide Web for delivering video advertisements to attract customers. Online advertising is often facilitated through companies called online advertising networks that connect advertisers to web sites that want to sell advertising space. One function of an advertising network is aggregation of advertisement space supply from publishers and matching it with advertiser demand. Advertisement exchanges are technology platforms used by online advertising networks for buying and selling online advertisement impressions. Advertisement exchanges can be useful to both buyers (advertisers and agencies) and sellers (online publishers) because of the efficiencies they provide. Advertisement exchanges are, however, often limited by the types of advertisements they can buy and sell, their inventory size, and abilities to target specific viewers (e.g., potential customers).

As the number of users accessing the Internet using video-playback capable wireless devices such as smartphones and tablet devices grows, improvements to online video advertising are useful.

SUMMARY

The disclosed techniques provide for techniques for calculating operational parameters of a video advertisement delivery system using a distributed computing system. Some example operational parameters include geo (e.g., information about geographic characteristics of consumers and advertisements delivered to the consumers), segments (e.g., consumer profiles) and unique impressions, i.e., video ad deliveries that can be counted as a single billing instance.

In one example aspect, methods and systems are disclosed for computing operational parameters of a video advertisement delivery system using distributed computing cloud, including transferring a plurality of data files from a plurality of geographically distributed advertisement servers to a first storage resource in the distributed computing cloud, providing a script-based program to the distributed computing cloud, executing, using resources from the distributed computing cloud, the script-based program to perform analysis of the plurality of data files, and storing results of the analysis on a second storage resource, wherein the results include at least one operational parameter of the video advertisement delivery system.

In certain embodiments, a machine-readable medium comprising machine-readable instructions for causing a processor to execute a method as described above is discussed.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
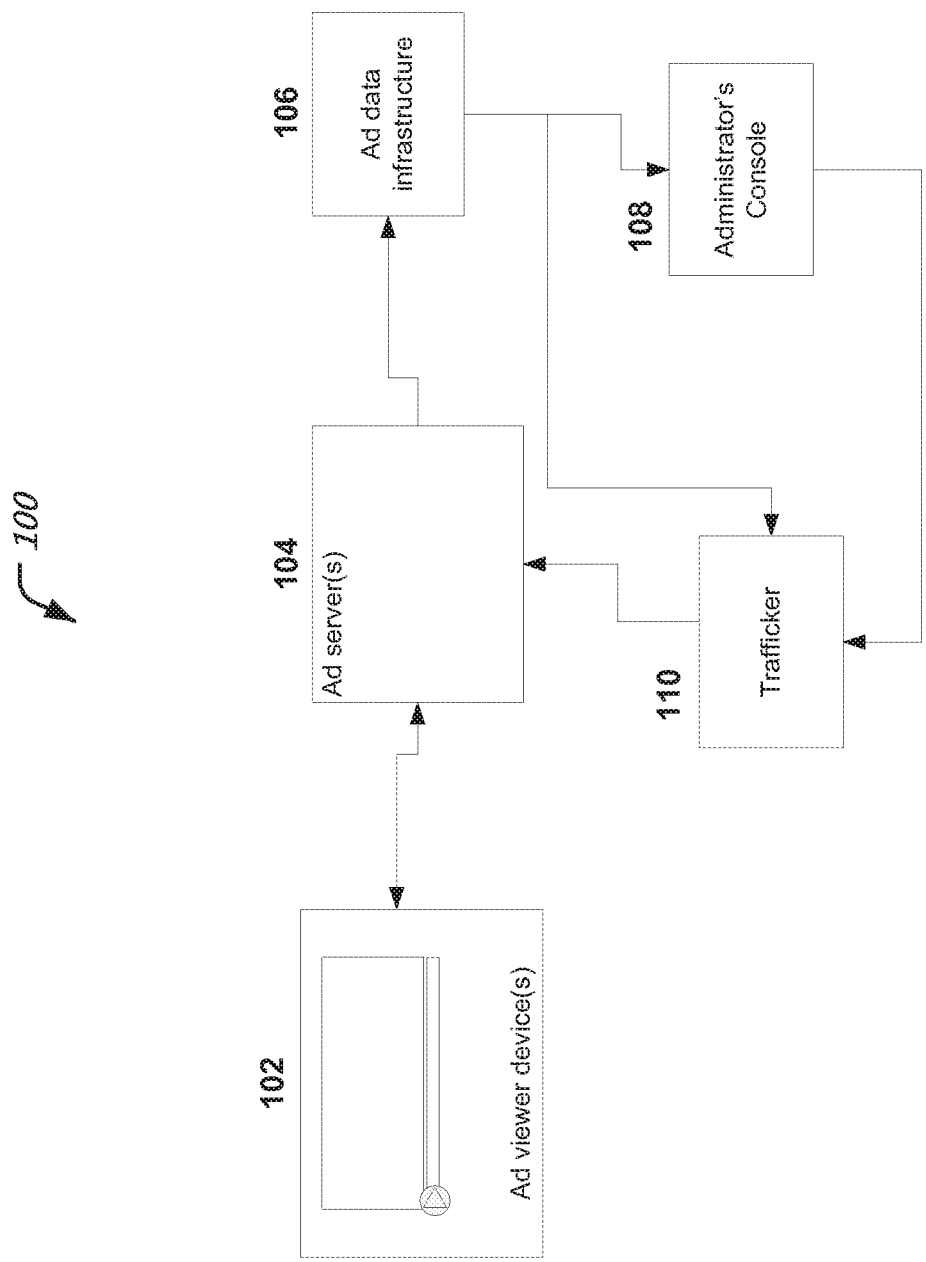
FIG. 1 illustrates a high level architecture for a video advertisement system.

In the following detailed description, numerous specific details are set forth to provide a full understanding of the present disclosure. It will be obvious, however, to one ordinarily skilled in the art that the embodiments of the present disclosure may be practiced without some of these specific details. In other instances, well-known structures and techniques have not been shown in detail so as not to obscure the disclosure.

In an increasingly connected society today, a large number of users, which may be in the millions at times, may be simultaneously using the Internet to access or browse certain web sites and load web pages into their user devices such as personal computers, laptops, mobile phones, tablets or other communication-enabled devices. Video advertisement tends to be an integral part of such user web activities and, accordingly, a video advertisement delivery system may have to process a large amount of advertisement insertion opportunities from around the world triggered by user web traffic. To provide effective video ads, such a video advertisement delivery system needs to be configured to process video ads with quick response time, e.g., less than 200 milliseconds in some cases, to the consumers. Furthermore, due to the voluminous amount of data generated related to advertisement delivery, billing may have to be streamlined by breaking into smaller portions of time, e.g., once every 15 minutes or once every hour.

The techniques disclosed in this document facilitate the operation of a distributed video advertisement delivery system that can be scaled up and down based on real time demand. Furthermore, the disclosed system leverages the use of computational resources from cloud, thereby having the ability to use just the right amount of resources for the right stage of data processing. These, and other, aspects are described in greater detail below.

As used herein, the term "1×1" means an "Impression Pixel." The abbreviation ADM refers to an administrator's dashboard. For media's purposes, this tool may be used to see the fill rate of integrated publishers' ad calls on a daily basis to help optimize delivery of campaigns.

As used herein, the term Billable Impressions means impressions that the advertisement exchange platform gets paid for.

As used herein, the term Billable Revenue refers to the revenue generated from the campaigns, as tracked in the 3rd party reports.

As used herein, the term Behavioral Targeting (referred to as "BT") refers to targeting approach utilizing 3rd party data sets and segmentation to display ads to users who have expressed interest or intent to purchase in certain verticals. Example: in-market for a car, interested in animals/pets, golf enthusiast, etc.

As used herein the term BRX (BrightRoll Ad Exchange) refers to, generally, a technology platform, enabling buyers and sellers to access video inventory in a self-service and scalable capacity where BrightRoll Ad Exchange is an example of such a system developed by BrightRoll.

As used herein, the term Buy refers to a user interface for buyers (e.g. advertisers).

As used herein, the term Companion (also called "300× 250" or "banner") refers to a banner running adjacent to preroll and usually remaining persistent and clickable after preroll is completed (size is typically 300×250 pixels).

As used herein, the term Cost refers to publisher costs; tracked by media, paid by finance.

As used herein, the term CPC (cost per click) refers to pricing model in which advertisers pay per click, instead of on a standard CPM model.

As used herein, the term CPE (cost per engagement) refers to cost per video starts.

As used herein, the term CPM (cost per thousand imps) refers to cost per (impressions/1,000). Pricing model for online advertising can be based on impressions or views where the advertiser pays the publisher a predetermined rate for every thousand impressions.

As used herein, the term CPV (cost per view) refers to pricing model based on payment per completed view.

As used herein, the term CTR refers to click through rate, which is a Standard metric used to gauge campaign performance.

As used herein, the term Discrepancy refers to difference between two reporting systems' impression counts.

As used herein, the term Fill rate refers to the percentage of a calls an integrated publisher sends that are filled by ads. For example, a publisher could send 500 calls but we may only have 400 ads to send them; therefore, the fill rate would be 80%. If we had 500 ads to send them, the fill rate would be 100%.

As used herein, the term Flight refers to duration of a campaign or line item of an order; broken down by dates.

As used herein, the term Impression pixel refers to a piece of code that tracks impression loads of an ad on a website (also referred to as a 1×1).

As used herein, the term InBanner (shortened to IBV) refers to video running in regular display units (typically 300×250 in size).

As used herein, the term Integrated Pub refers to publisher whom we've established both payment terms and completed an integration where we can serve videos directly into their player.

As used herein, the term Inventory/Remnant Inventory refers to inventory is the volume of impressions a publisher has available. Remnant inventory is all the unsold inventory a publisher has not been able to sell to direct buyers, and then offers to networks at a discounted rate.

As used herein, the term Margin refers to profit/revenue (in %).

As used herein, the term Pacing—campaign delivery performance with date of flight taken into account refers to total delivered imps/(current days in flight*(total imps/total days)).

As used herein, the term Performance Metrics—the metrics on which a campaign is judged (i.e.: click through rate, completion rate, acquisitions, etc.).

As used herein, the term Preroll refers to an instream ad unit, running ahead of user initiated video content.

As used herein, the term Search & Keyword retargeting refers to a module that allows advertisers to find relevant users identified in our network through use of third-party vendor data and cookie-ing.

As used herein, the term Signed Pub refers to publisher (e.g., an ad viewer-visited web site) with established fixed payment terms with.

As used herein, the term Survey/Study refers to research collected by a 3rd party vendor to establish campaign branding performance.

As used herein, the term Start, Middle and End Pixels (Quartile Reporting) refers to pieces of code that track the duration of the video view. End pixels track completed views. Duration data cannot be gathered without implementing these pixels.

As used herein, the term Third-Party Reporting refers to external ad-server reporting used by clients to verify proper ad delivery (typically DART or Atlas)

As used herein, the term VAST refers to stands for Video Ad Serving Template.

As used herein, the term Video Block refers to a product offering which allows advertisers to buy out a majority of our network during a 1-3 day period. Typically priced on a CPV basis.

As used herein, the term VPAID refers to stands for Video Player-Ad Interface Definition.

Examples of System Architecture

FIG. 1 depicts the simplified view of an example of a video advertisement system 100, e.g., a video advertisement system in which a video advertisement exchange is used for ad bidding. An ad viewer's device 102 (e.g., a computer, a wireless device or a mobile device) is communicatively coupled (e.g., via the Internet and a wired or wireless connection) with an ad server 104. The ad server 104 provides ad delivery data to an ad data infrastructure module 106, described further in detail below. The module 106 can make ad metadata available to an administrator via an administrator's console 108, which allows an ad administrator to add/change delivery preferences of their advertising campaigns. The administrator's console 108 is coupled to be in communication with an ad metadata processing engine (trafficker) 110. The trafficker 110 compiles and makes ad delivery instructions/configurations available to an ad decisioning system 104.

The ad server 104 may (perform functions such as handling incoming ad requests front multiple ad viewer devices 102, and respond with an ad or a "no ad" placement. The ad server 104 may operate on a time budget, e.g., 50 to 150 msec., within which it must respond to an ad request. The ad server 104 may provide ad data to the viewer device 102 using VAST format. The decision about which advertisement to be sent may be based on various factors and real time data such as publisher placement, uniform resource locator (URL), a geographic location of the viewer device, time of day, demographic segment to which the viewer belongs, and so on.

In some implementations, the ad server 104 infrastructure may include an event capture module that may capture defined events during the time a video advertisement is played back on the viewer device (e.g., video start, a mid-time, a specific video frame, the last frame, any other clicks made by the viewer while viewing the video, etc.). The ad server 104 may also perform a real time bidding auction with third-party ad servers for the video advertisement.

The data infrastructure 106 may gather log data from ad servers and togging servers, as further described below. A functional module in the data infrastructure 106 may correlate impressions with bids to generate billable data. Another module within the data infrastructure 106 may calculate financial data. Yet another module within the data infrastructure may provide data to operators and other users of the system (e.g., bidders, publishers, ad agencies, etc.) and other programmatic interfaces for monitoring and control of the advertisement system 100. Another functional module in the data infrastructure may audit data, as further described below. The ad data infrastructure 106 may also provide results of delivery data computed to the trafficker 110.

The administrator's console 108 may include a plurality of user interfaces (UIs). For example, the administrator's console 108 may enable an operator to control tasks such as collection of information, e.g., advertisements, targeting data, publisher placements (ADM), etc. Another UI that may be included in the administrator's console 108 is an UI that allows third party buyers a real-time-bidding (RTB) console to interact with the real time bidding process.

In some implementations, the administrator's console 108 may include an UI that provides information to various users of the system, including, e.g., a media team for monitoring brand safety based on the video to be displayed to the viewer, reviewing creatives (e.g., look-and-feel of the viewer's screen immediately before, during and immediately after the video advertisement is displayed) that will be seen by the viewers.

Another UI may be provided in, e.g., the administrator's console 108 for a research team to analyze audience data and determine whether targeting guarantees are met or not, etc.

Another UI may be provided in the administrator's console 108 is an UI with views to collected data of advertisement requests and deliveries to entities such as advertisers, publishers and third party buyers.

Yet another UI in the administrator's console 108 may be an UI that allows viewing and editing of configuration data such as placement tags, segment tags, host information, definition of cookies that are stored on the viewer device based on these tags, and so on.

The trafficker 110 may compile data from various databases in the ad data infrastructure and controls site targeting (e.g., which region to focus an ad campaign on), pacing (e.g., how many ads per unit time to be sent out to the users, so that an ad campaign has a desired temporal distribution), pricing (e.g., should bid prices go up or down based on observed real time conditions), etc. The trafficker 110 may communicate configuration files to the ad servers by first copying the files to the cloud, then issuing a notification that new configuration files have been generated and allowing the ad servers to go pick up the new configuration files. One or more modules may be deployed to ensure that prior to releasing of the new configuration files to the ad servers, the ad delivery data files from a previous time interval are copied out of the ad servers and available for processing. The operation of ad servers and the data infrastructure mechanism can run in a pipelined manner and periodically in time, while being asynchronous with each other.

Figure 2:
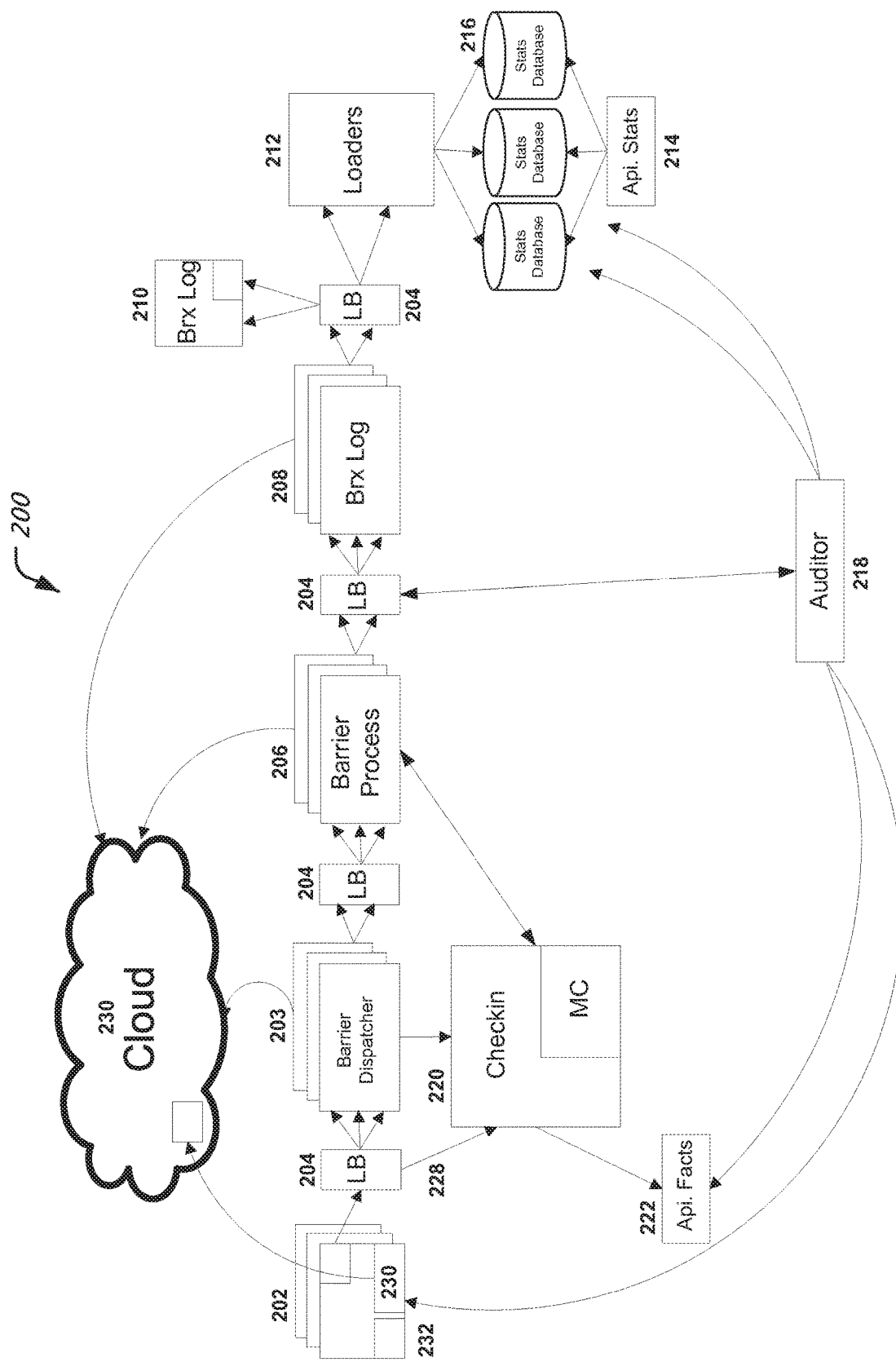
FIG. 2 is an architectural block diagram of a video advertising data processing platform.

FIG. 2 depicts an example video advertisement insertion system 200 in which various functional entities such as ad servers can operate, as described in this document. Resources in the computer network, collectively called the cloud 230, may be used for communication among various functional entities, e.g., ad servers 202, load balancers 204, barrier dispatchers 203, barrier processes 206 and logs 208, as further described in the present document.

Referring to FIG. 2, examples of additional detail of the ad server 104 and data infrastructure 106 of FIG. 1 are illustrated and described. Ad servers 202, which can be substantially similar to ad servers 102, represent one or more machines that are responsible for delivering ads to end users. In operation, Ad servers 202 may deliver firing pixels, impressions (these terms are explained elsewhere in this document) etc. over the Internet to end viewers. Each ad server 202 may log events locally. The local logs may generate ad delivery data files. New files may be created every pre-determined time period. For example, in some implementations, ad servers 202 may rotate new log files every 15 minutes.

Another module called the archiver module 230 (e.g., Brightroll's BRX archiver) may be a part of the ad server 202 or may be a stand-alone computer and may periodically copy over the completed log files to a cloud based service such as Amazon's S3 cloud based service. After a file is uploaded, the archiver module may send a message to a dispatcher module, which may be implemented on one or more hardware platforms.

At an appropriate time (e.g., upon reaching a time period, or soon after receiving a notification that a new file is available), the dispatcher can download the file from the distributed computing cloud. The file may be enumerated and brought to the module. Individual keys, or line items, may be parsed. In addition, site placement data and segmentation data (e.g., geographical area associated with the delivery and a demographic profile of the viewer to whom the ads were delivered) may also be parsed. Each line item may contain information that can be processed to generate billing based on which ad was delivered to which viewer and other associated information (e.g., demographic or geographic information of the user, etc.). The module may provide messages as a result of parsing through the files to a next stage (barrier process) through a load balancer. The messages may be metadata files. These messages are waiting to be completed.

Another module called the checkin module 220, which also has a memory cache (MC), may receive notification that a given machine has sent data to S3. When all machines are checked in, the message in the barrier process that had been waiting to start processing will then be released to the next process.

The system in FIG. 2 includes an api.facts module 222 which provides a list of all the machines that exist in the ad server 202. The Checkin module 220 may include a memory cache called mem cached. When an ad server 202 does not have any data to report, the ad server 202 may simply report into the checkin module 222 via a message 228.

As machines check in, a list is updated when all machines check in, or a time period threshold (GoCode timeout) expires, a key called GoCode is used as follows. The GoCode key is set only if all ad server machines 202 have checked in. If all machines have not checked in, but the GoCode timeout expires, then the messages waiting in the barrier process may go ahead and start next processing. In practical implementations, there can be hundreds of messages checking GoCode—whether it is set or not.

In some embodiments, Brx logs 208 is where actual computations may be performed. When messages are released for computation based on GoCode, a format called RQ format may be used. In some implementations, all inter-stage communication in FIG. 2 may be implemented using the same data format (RQ format). Each message will contact S3 and get all the files needed for computation. There may be multiple types of files. For example, these files may only include as impressions or advertisement delivery data. Depending on the type of processing, different types of files are downloaded from.

Each type of process uses its own file type. The Brx logs 208 produce two pieces of information Stats (actual computations) and manifests. The two pieces of information are sent to the loaders 212, and loaders 212 can write them into databases.

In some implementations, from the time interval between when the files are received to the ad delivery data computational results (e.g., billing data) is produced may be a computing latency interval. It is beneficial to have the computing latency interval to be smaller than the rotation of configurations. In one beneficial aspect, the amount of time gap between when a previous ad delivery data files are processed and may be indicative of the computational resources and the busyness at which the system is running. A capacity calculation may be made based on how much time difference is available between start of the next ad delivery data file processing and the end of the previous ad delivery data file processing.

The system may be pipelined such that while one part is working on one set of ad delivery data files, another part of the system may be working on another set of ad delivery files before or after the currently worked ad delivery data file.

In some implementations, the use of cloud based computational resources may allow easy allocation and de-allocation of resources (e.g., computing power, storage space, etc.) depending on which subsection of the pipeline described above is able to currently meet its allocated time budget or not.

The load balancers 204 in the above-disclosed system architecture can also advantageously be used to provide isolation among different stages of the pipeline. Depending on run time conditions, different stages may require different type of computational power. Due to "isolation" offered by the load balancers, the number of computing platforms or resources made available to each stage can be changed independent of the other stage.

For example, in some implementations of FIG. 2, a higher number of ad servers 202 may result in load being spread over multiple ad servers 202, thereby reducing the resource requirement of each individual ad server 202. However, due to the increase in the number of ad servers 202, a larger amount of messages may have to be processed by the downstream stage.

For example, the resource scaling for the barrier dispatcher 203 may depend on the number of site placement and line items that need to be processed. In some implementations, the BRX logs may, e.g., be sharded to accommodate increasing and decreasing resources on as-needed basis. Sharding refers to partitioning of a database to introduce some type of efficiency in the computing (e.g., faster results). The sharding can be performed using business rules. For example, data that directly impacts billing or other revenue generating ability can be sharded in one logical group, while other data can be sharded into another logical group.

In some embodiments, the various functional modules may be implemented on computing resources that are instantiated using cloud-based resources by specifying desired computing attributes. The attributes include, e.g., input/output bandwidth of a machine, cache storage capacity of a machine, computing power (CPU speed) of a machine, etc. For example, a platform that implements MemCache may be instantiated using large memory capacity. Whereas, a file parsing module may be instantiated using large i/o bandwidth. Or another functional module may be instantiated using higher number crunching capacity (e.g., CPU speed).

The load balancer 204 themselves may also be virtual machines (i.e., computing resources in the cloud). The load balancer 204, e.g., could be HAProxy load balancing software.

The auditor 218 validates data integrity. For example, auditor 218 determines whether or not various data generated by the system is accurate by cross-checking data from different sources. To assist with auditing, the ad servers may include a module called Auditor Agent 232. The Auditor 218 may request a list of all ad server hosts. In some implementation, the api.facts module 222 may provide the list. At a given auditing time instant, the auditor 218 may contact the ad server 202 and request a list of files on the disk along with the same metadata. The auditor time instances may have a predetermined amount of delay from the epochs of ad delivery data file rotation. While auditing for a time period occurs after the time period elapses (or has begun), the periodicity of the auditing process need to be the same as the periodicity of rotating ad delivery data files. To help time syncing the auditing process with data parsing process, a "GoAudit" command may be generated every so often, and may include a start time/end time definition of an epoch of auditing.

In some implementations, the auditor 218 may not duplicate all the calculations performed by BRX log 208, but may simply look for whether or not the BRX log 208 used exactly the same files that the ad servers 202 provided to the auditor 218.

A host manifest may be compiled and includes all the files that each host in an ad serve is aware of along with metadata such as file size and last updated time. That information is gathered. Then stats dB database 216 is used to receive manifests generated by the BRX log module. These manifests tell which files were used by which BRX log machine to generate its data. The BRX log manifest also has the same metadata as the metadata received from ad server 202. The two data are compared to check if the files in the BRX log match the files received from hosts in ad server. A determination is made, e.g., by the auditor 218, about files that are present in the host manifest, but are not seen in the BRX log manifest and files that are not present in the host manifest but were included in the BRX log manifest. If certain files from host manifests were not used, then these computations are run through the BRX log one more time.

When everything checks out, an entry is made into a database that the checked interval is audited and data is good. If things do not check out, then data is passed one more time through the BRX log to generate the corresponding BRX log entries.

In some implementations, a direct communication between the auditor 218 and the BRX log 208 may be used to ascertain whether or not the BRX log operation was finished. However, a message might still be being processed at the BRX log 208, therefore a handshake may not catch this case.

In some implementations, a BRX log 208 reprocessing may be performed. A task that did not match out is queued up for BRX processing one more time for reprocessing (in BRX log validators 210). If a file is missing, then all tasks that would have been computed using that file are queued up for reprocessing.

One reason why auditor 218 may not be able to match is because files may not be delivered or may be delivered late through a cloud computing service.

If data is lost and reprocessing is not successful either, manual intervention may be performed to find cause of error.

Additional computing resources may be used to cross-check the work performed by the auditor 218. These modules, called BRX log validators 210, may be configured to operate on a portion of the data processed by BRX log module 208. For example, when changes are made to code running in the system or to business logic, rather than lose revenue in the system due to erroneous computations, it may be beneficial to monitor accuracy of BRX log 208 computations using the BRX log validator 210. The shadow BRX logs may be manually operated to verify the results of cross-check with the BRX log outputs. The BRX log validator 210 may be running a new code base, while the BRX log may be running the existing code based. The same entries may be processed by both the new and old code based and semi-manual verification may be performed to ensure that the results of the two logics match. For example 1% of data may be used to perform such validation. Discrepancies may be resolved by manual intervention and debugging.

BRX archiver (not shown in FIG. 2) may, in addition to sending data, may also send other data access logs, paid logs, etc. to the cloud based service.

Data may be revenue impacting (paid data) or non-revenue impacting data (other) e.g., error pixels and segments. Error pixels are events that are generated by player or server when something gets wrong. Segment pixels are pixels that customers can drop on their page to correlate a viewer with visits to the customer's web site. This information may have different service layer agreement (e.g., 2 hours for paid vs. 8 hours). Sharding may be (performed among pools of servers that are isolated from each other may be working separately on paid data and other data.

An auditor module may be dedicated to the paid data auditing and other data auditing. Each auditor blesses, or approves, its own data type. This way, the blessing, or approval, of paid data stats is not blocked due to some problems in the non-paid (other) data auditing.

Amazon Elastic MapReduce (Amazon EMR) is a service from Amazon in which a user can specify a need for a number of machines. The user can pass a Pig script to the EMR, then the compiler of PIG will transform the scripts into a series of jobs that extracts and acts upon them. From time to time, in addition to the previously discussed files, the ad servers push various other data files into the cloud. These files include information that is not related to bitting or impressions, but includes information that may be beneficial for getting a better understanding of ad campaign effectiveness and overall operation of the media ad insertion system. For example, the data may include geographical information (geo) of ad delivery—e.g., which viewers in which area were delivered how many ads. As another example, the data may include viewer delivery identities so that unique impressions can be calculated. The data may also include segmentation data (e.g., user profiles). This data is stored into cache access log. Some of the data of may be re-used. A module called "EMR systems" may be used to run locally a job on the cached data. The EMR will instantiate and execute a job using PIG script. The cloud based mechanism may move the files to be used to a Hadoop file system (HDFS) and crunch the data and writes it back into the cloud.

One advantageous aspect in which the EMR processing helps is to be able to identify "uniques" from the archived data. A unique represents a set of data that is (uniquely) identified, e.g., ad revenue during a certain time window (e.g., last month). In other words, the data has to be de-duplicated or made unique by comparing ad data from different time periods.

As previously discussed, files are rotated and data is analyzed in chunks of data intervals. However, when data that does not belong to one specific ad delivery data file is to be analyzed, the above-discussed EMR technique could be advantageously used based on data files satisfying the search window. For example, it is not beneficial for a video ad insertion platform provider to generate billing information multiple times for a single video ad display to a viewer. Because the ad delivery data files by themselves do not contain any information about ad delivery data files in other time intervals, a process such as the above discussed EMR process, which operates outside of the intervals, may be beneficial.

Raw data may be stored incrementally, while the unique calculation may elastically stretch over multiple intervals of ad delivery data file rotation. For example, multiple serving of the same advertisement to same person during two different interval may be detected and harmonized into a single "unique."

Examples of Operational Complexity

The above-discussed system may be deployed in real life to facilitate and track video advertisement placement over the Internet. The Internet may cover an entire nation, of may extend to larger geographic areas, up to covering the entire world. In some implementations, a 15 minute period may be used to turn the ad delivery data files that are generated by the ad servers. A similar period (e.g., 15 minutes of some other time interval) may be used to rotate configuration files that are transmitter by the trafficker to the ad servers. Each ad server may record hundreds of thousands of impressions (video ad deliveries) in its ad delivery data file. Every fifteen minutes, thousands (e.g., 5K to 15K) of ad servers may write their own ad delivery data files. The ad data infrastructure mechanism therefore may need to process several million line items on a per-fifteen minute basis.

Examples of Leveraging the Power of Distributed Computing Cloud

As described in this document, the video advertisement insertion system may be implemented in several stages as illustrated in FIG. 2, e.g., the barrier dispatcher modules 203, the barrier process module 206, the Brx log modules 208, the auditor 218, and so on. In some implementations, the ad data infrastructure mechanism 106 comprises a plurality of processing stages, as discussed above, each stage comprising multiple modules for performing certain tasks, wherein tasks to a given processing stage are assigned by a corresponding load balancer (LB) 204. Each intermediate processing stage (e.g., the barrier dispatcher 203, the barrier process 206) receives results of operations of a preceding processing stage and provides results to a subsequent processing stage, with a last processing stage forwarding its results for storage in a database 216.

It will appreciated that the above-discussed system architecture provides several operational advantages. For example, the geographical reach of a video advertisement insertion system could be wide spread, spanning across a continent. The use of a cloud infrastructure, such as Amazon's S3, provides geographic ubiquity and data backup/transfer features to the ad data infrastructure. The use of intermediate load balancing stages (load balancers themselves could be instantiated as resources from the cloud computing service) allows scaling of resources deployed at each stage. In some implementations, the type of computing resources used at each stage may be different. For example, Brx log 208 may perform significant amount of number crunching—e.g., data compare, subtraction, addition etc., while Barrier process may perform a significant amount of file transfers and may thus need high speed data input/output bandwidth. An operator can monitor the performance of each stage, e.g., the time taken for data processing at each stage, and accordingly easily deploy resources matching the needs by instantiating from cloud. In one advantageous aspect, a video advertisement insertion service provider can thus replace capex (e.g., the need to buy and maintain in-house several computing platforms of different capabilities to meet peak demand of each stage) with apex (i.e., rent or not rent computational resources front a cloud computing service, based on current load on the system).

In another advantageous aspect of the above-disclosed platform comprising multiple pipelined stages, a video advertisement insertion service provider can mix-and-match cloud computing resources with dedicated "in-house" resources. For example, some computational stages (e.g., ad servers 202 and barrier dispatchers 203) may communicate with each other by copying files (e.g., ad delivery data files or configuration files) to and front the computational resource cloud 230. One advantageous feature is that the data used to keep these stages lock-stepped is not lost and can be recovered from any machine anywhere by leveraging the distributed nature of a cloud computing service. On the other hand, communication via cloud based file read/writes may not be desirable for certain stages—or for sharding and distributing computational tasks among different computational platforms at each stage. This allocation of resources may therefore be performed using local control of sharding tasks, which may then be executed on local dedicated machines or resources front the cloud.

Figure 3:
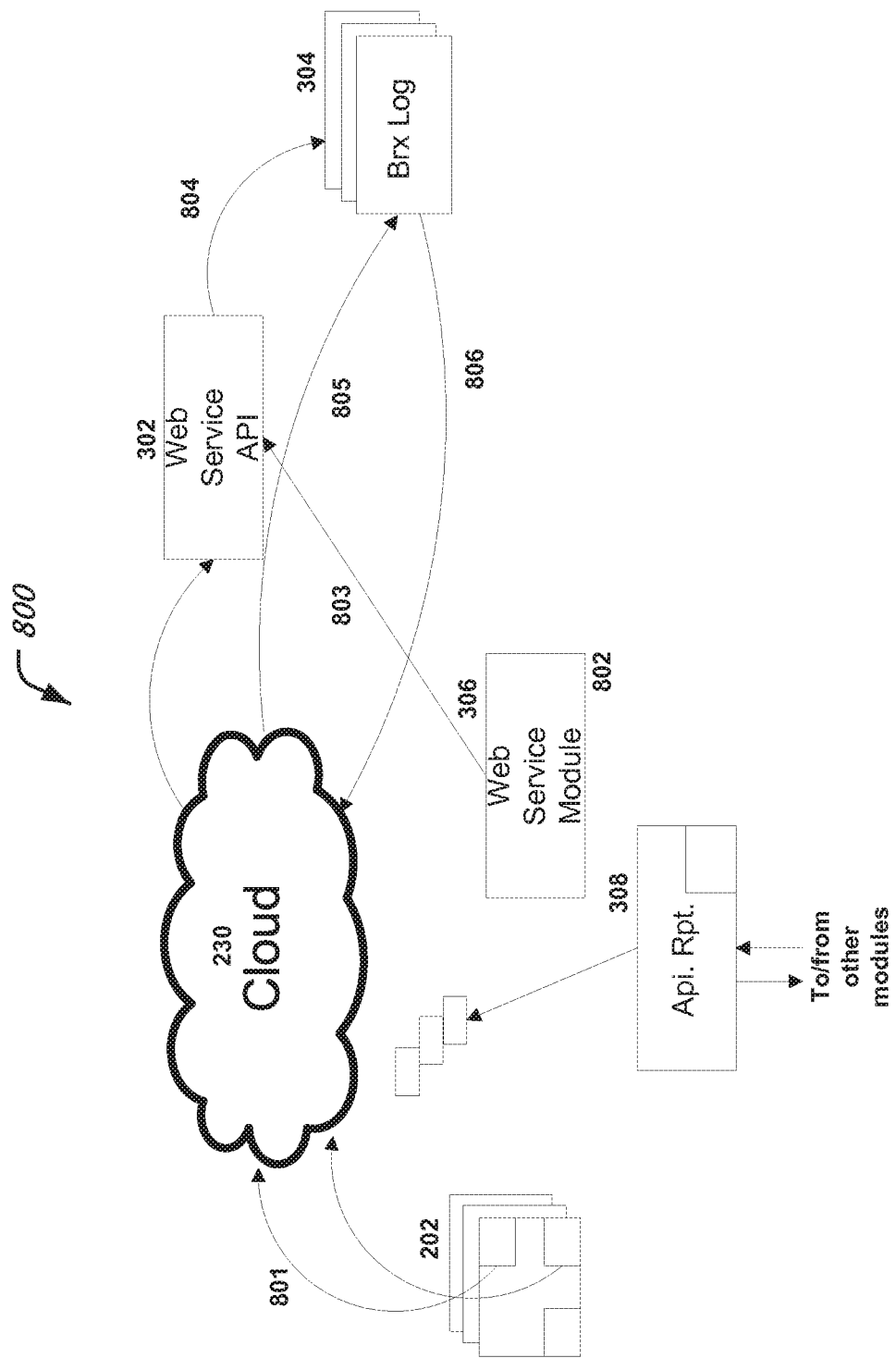
FIG. 3 is a block diagram of a batch report generation system.

FIG. 3 is a block diagram description of a system 800 within the ad data infrastructure for performing analysis of additional data and configuration files is depicted. As discussed previously, the ad server 202 may from time to time upload locally stored files to the cloud 230.

Below is one example sequence of message transfers depicted in FIG. 3.

801. File are uploaded from ad servers into clouds, including a PIG script.

802. A chron job (which tracks time) kicks in at some time. EMR caches the data to be used for running a PIG script.

803, EMR communicates with cloud based web service using a pre-defined API.

804. AWS stores data to HDFS.

805. The HDFS machine fetches the appropriate data from the cloud.

806. The HDFS writes the results back to the cloud.

A module called api.rpt module 308 may report that the results are available.

As can be seen, resources from cloud can be utilized to produce operational parameters such as Geo-distribution of ad requests and impressions per site requests, the number of unique impressions (or video ads) delivered, segment data (consumer profile), and so on. By making the relevant data available through cloud for processing, several non-obvious operational advantageous can be gained. For example, in a pipelined video ad delivery data processing system, such as described in U.S. patent application Ser. No. 14/214,431, entitled "Audited Pipelined distributed system for video advertisement exchanges," concurrently being filed herewith, which is incorporated by reference herein in its entirety, cloud computing resources may be instantiated or used on an "as needed" basis. The use of distributed computing resources as disclosed above streamlines the use of cloud computing resources by being able to optimize data and file movement in the cloud so that each pipelined stage is able to meet target time budgets.

Figure 4:
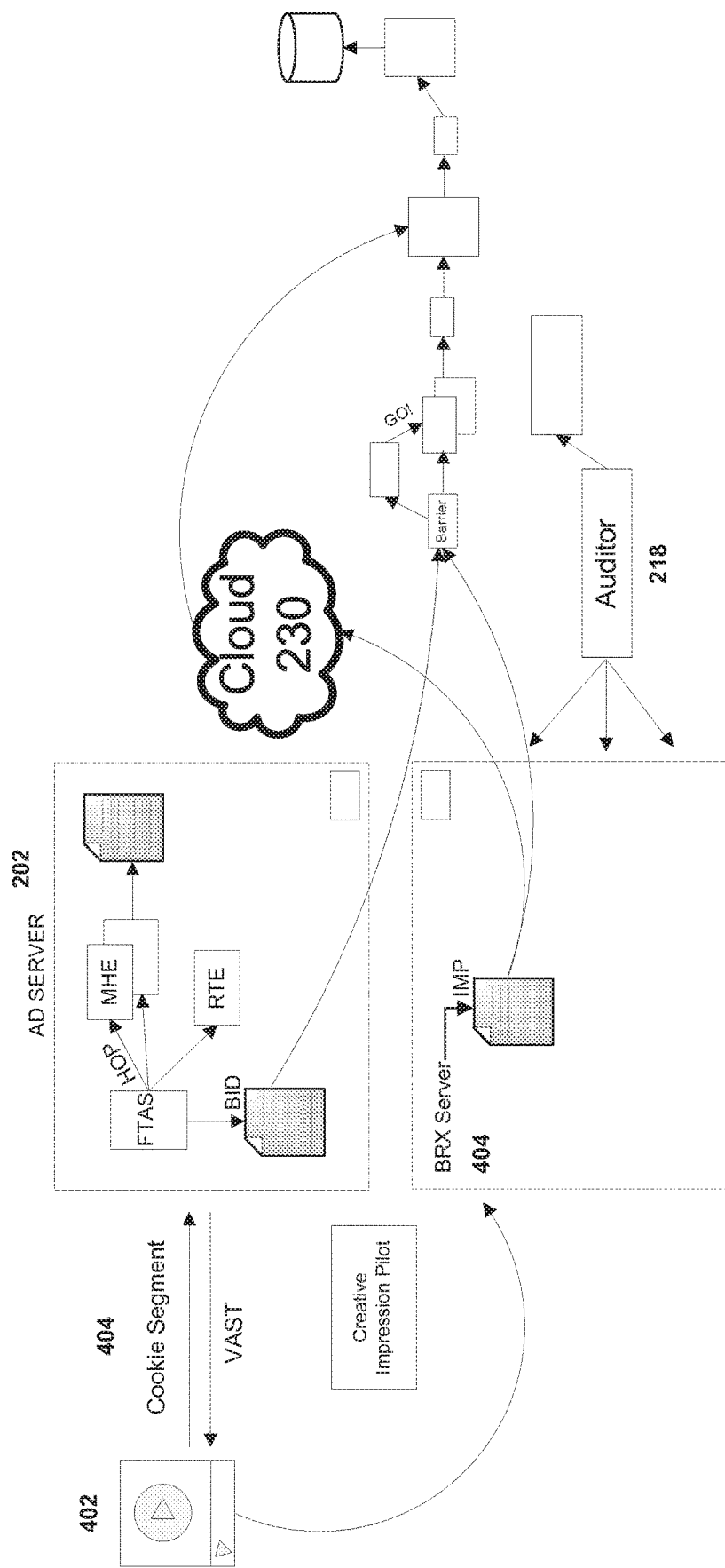
FIG. 4 is a block diagram representation of a portion of a video delivery system.

FIG. 4 depicts an example architecture of a video advertisement insertion system in which video advertisements are inserted into content being browsed by a user using, e.g., the previously described bidding exchange technique. Only a few operational details are depicted in FIG. 4 for clarity. From left to right of FIG. 4, a video player 402 (e.g., in a user device) communications with ad server 202, using protocols 404. Referring to FIG. 4, video player 402 on a user device receives a VAST formatted advertisement information 404. The video player 402 may issue a request to ad serving subsystem (e.g., ad server 202). The video player 402 may be a plugin or a standalone application. One example of advertisement would be pre-roll advertisement. The video player's request may identify itself with a site placement identification, by which the ad serving system becomes aware of a location of the video player. This may be implemented as a specific number (e.g., 12345—which is understood as a site placement id). The site placement ID is provided by the ad serving system to the publisher that controls the video player. The publisher is then provided with a VAST document. In contains information about impression pixels to be fired, and so on. A typical VAST document may span two to five internee protocol (IP) packets. The Real Time Ad Serving (RTAS) may by a subsystem within the ad server system and provides this VAST document. The ad server system also includes one or more Medial Handling Engines (MHEs). Each MHE handles a portion of the load going to system.

RTAS may use MHEs using a load balancing technique such as round robin. The RTAS and MHEs may be implemented on same platform, different platforms, in the same geographic location of different geographic locations.

The MHEs take in a list of line items, geo location from IP address, how often the device has seen certain ads, etc. information that is included into a cookie that is received from the video player's device. The ad server module also has access to a configuration file that specified attributes of line items, how they should be targeted and so on.

Within each MHE the, MHE runs auctions based on the line items. The result of the auction is returned as two prices. First price auction—receive bid from 5 bidders—they give a price—and you select your best. Second price auction—bidders give a bid and a maximum bid they will give. The winner will be a penny above the maximum of other people's bids or maximum bids. RTAS collects top two prices from all MHEs, and then gets a final bid price. The winner and the bid price is written down into a bid file. MHEs now generate a VAST document that is appreciate for the video player and is based on the winning bid. This VAST document is passed to RTAS (when to fire which impression, etc.).

Impression pixels—a bid is not sufficient to know if ad platform should be paid. The video player, at the right time, fires the impression pixels, which indicate to the advertisement system that the advertisement was actually consumed. When and where to insert the impression pixels may be determined by the advertiser or may also be assisted by the ad platform using a shim.

The BRX servers 404 receive impressions, parse it and generate log files based on these. The impressions are stateless.

Correlation of log files is an important aspect. For example, the system may receive impressions for which there were no bids. This may indicate, e.g., some type of fraud or other error occurring in the system. Or there may be accidental duplication of impressions. For example, there might be a bid without impression (e.g., user turned off video player) which may mean no billing.

Each module may include an archiver process. The files are rotated every 15 minutes. The archiver process uploads the file to the cloud. Each file may be in the 100 to 200 Mbyte range. The archiver process sends a message to the checkin 220 box to indicate that it has finished its archiving work. The archiver process also sends a message to the barrier boxes, the message lists the file uploaded. In some implementations, the message is sent directly to the checkin box only if no files exist on disk (meaning no upload to the cloud happened). This usually happens when the box is idle and not in rotation/live traffic. Otherwise, the message is sent to the barrier dispatcher box. At the end of dispatcher being done enumerating/mapping the IDs in that file, a message is sent to checkin with the host information that sent the message. The barrier boxes create a bunch of outgoing messages that split up the work, E.g., for line item 15 go here. For line item 100 go somewhere else. For each line item, a specific instruction may be provided about what needs to be done, e.g., on instruction may be to compute all impressions for a particular line item.

One task performed may be de-duping of the message. As an example, fifteen ad server boxes may each receive responses from each ad server site. Thousands of messages may be de-duped to remove identical duplicate entries. A check-in is performed for each box to see if it has checked in. Once all messages have been de-duped and all machines have checked in, a start message is fired. (Barrier process). De-duping may only touch metadata, not log files themselves. For example, at a given time, 10,000 line items may be used in the system. Messages may of the type "process this line item for this interval" "hand all impressions for this video" etc.

BRX log modules receive messages from the barrier process boxes. A load balancer may provide load balancing for tasks propagated from BRX process to BRX log. Every 15 minutes, e.g., the BRX logs may implement 10 different queries on the 100s of Megabytes of data. BRX log generates a CSV or SQL file of results (1 to 150 line items, e.g.). A line item may have one or more creative associated with it. The log files may be generated—per 15 minutes per line item. In the network, 100 to 200 million responses may be received.

BRX logs themselves access cloud service to receive the ad delivery data files. The cloud infrastructure may be used to ensure wide geographic availability of files, with backup copies available in the cloud. The BRX log may generate files at the rate of processing 100 GB per day. The results from computations may be small (few hundred megabyte), but thus require processing of large amount of data on a tight timing schedule (e.g., once every 15 minutes, or the period of rotation of files).

In one exemplary aspect a method of operating a video advertisement (ad) system is disclosed. The method includes controlling an ad server configured to receive a plurality of ad requests from a plurality of viewer devices, provide a plurality of ad responses to the plurality of viewer device, generate an ad delivery data file that includes information about delivery of ads to the plurality of viewer devices, and copy the ad delivery data file to a distributed computing cloud. The method also includes controlling an ad data infrastructure mechanism to copy the cloud-based ad delivery data file into a local memory, process, using the plurality of ad responses, the copied ad delivery data file to generate a first billing data comprising information about ads that were placed. The method further includes controlling the ad data infrastructure mechanism to receive a configuration file from the ad server, verify that all items in the configuration file from the ad server were used in the generation of the first billing data, and remove non-verifiable items front the first billing data to generate a final billing data.

In one exemplary aspect a method of operating a video advertisement (ad) system is disclosed. The method includes controlling an ad server configured to receive a plurality of ad requests from a plurality of viewer devices, provide a plurality of ad responses to the plurality of viewer device, generate an ad delivery data file that includes information about delivery of ads to the plurality of viewer devices, and copy the ad delivery data file to a distributed computing cloud. The method also includes controlling an ad data infrastructure mechanism to copy the cloud-based ad delivery data file into a local memory, process, using the plurality of ad responses, the copied ad delivery data file to generate a first billing data comprising information about ads that were placed. The method further includes controlling the ad data infrastructure mechanism to receive a configuration file from the ad server, verify that all items in the configuration file from the ad server were used in the generation of the first billing data, and remove non-verifiable items from the first billing data to generate a final billing data.

Figure 5:
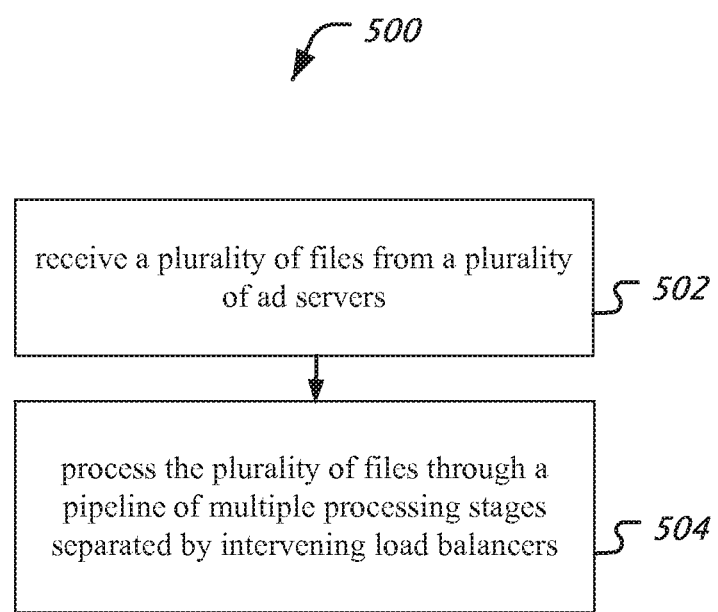
FIG. 5 is a flowchart representation of a pipelined data computing process using cloud based resources.

FIG. 5 is a flowchart representation of a process 500 of operating a digital media advertisement system.

At 502, a plurality of files are received from a plurality of ad servers, each file including a plurality of line items, wherein each line item corresponds to an ad delivery instance.

At 504, the plurality of files through a pipeline of multiple processing stages separated by intervening load balancers, wherein each processing stage receives its input data by reading from a cloud service and each processing stage writes its output data to the cloud service. The processing tasks are sharded across multiple hardware platforms in each processing stage, the sharding based on a logical partitioning of the corresponding input data.

In some implementations, results of the processing the plurality of files are generated an headroom interval (e.g., 5 minutes) before expiration of a target time interval (e.g., 15 minutes) after the plurality of files are received from the plurality of ad servers. A measure how much earlier (e.g., 5 minutes earlier than the 15 minute budget) is used to measure load on the system and thus controlling the resources allocated to the pipeline of multiple stages.

Figure 6:
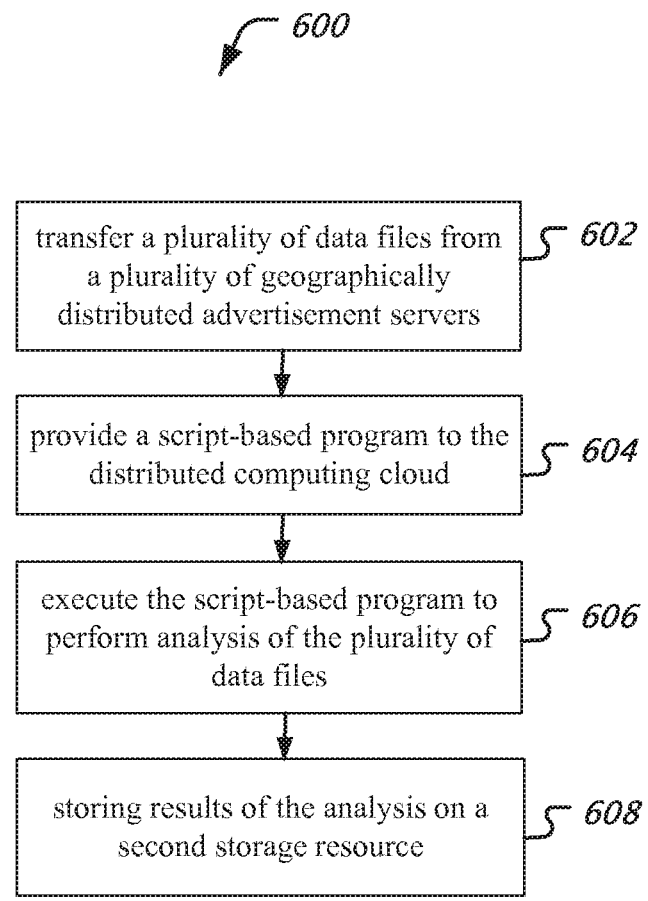
FIG. 6 is a flowchart representation of a process of computing operational parameters of a video advertisement delivery system using distributed computing cloud.

FIG. 6 is a flowchart representation of a process 600 of computing operational parameters of a video advertisement delivery system using distributed computing cloud. The process 600 includes transferring a plurality of data files from a plurality of geographically distributed advertisement servers to a first storage resource in the distributed computing cloud (602), providing a script-based program to the distributed computing cloud (604), executing, using resources from the distributed computing cloud, the script-based program to perform analysis of the plurality of data files (606), and storing results of the analysis on a second storage resource, wherein the results include at least one operational parameter of the video advertisement delivery system (608). The operational parameters may include one or more of a geographic data; a segment data and a unique impressions data.

In some implementations, a system for computing operational parameters of a video advertisement delivery system using distributed computing cloud includes a distributed computing cloud, a module that transfers a plurality of data files from a plurality of geographically distributed advertisement servers to a first storage resource in the distributed computing cloud, a script module that provides a script-based program to the distributed computing cloud (e.g., Pig script), a computer that executes, using resources from the distributed computing cloud, the script-based program to (perform analysis of the plurality of data files; and a storage module (e.g., HDFS) that stores results of the analysis on a second storage resource, wherein the results include at least one operational parameter of the video advertisement delivery system.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware; code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:
1. A computer-implemented method, comprising:
    processing, utilizing a first code base, a plurality of files through a pipeline of processing stages, the processing comprising:
        controlling one or more intervening load balancers positioned before a first processing stage of the processing stages to select files from the plurality of files and provide the selected files to the first processing stage;
controlling storage of the selected files received by the first processing stage to a distributed computing cloud;
controlling storage of output data written by the first processing stage based on the selected files to the distributed computing cloud; and
controlling sharding of processing tasks included in the first processing stage based on partitioning the selected files into at least two logical groups;
cross-checking the processing of the plurality of files through the pipeline using a second code base that is different than the first code base utilized to process the plurality of files through the pipeline to validate the processing of the plurality of files through the pipeline using the first code base by determining whether a first result of processing the plurality of files using the first code base matches a second result of processing the plurality of files using the second code base, wherein the validating comprises determining whether there are one or more discrepancies between the first result and the second result;
transferring a second plurality of data files from a plurality of geographically distributed servers to a first storage resource in the distributed computing cloud; and
storing results of an analysis of the second plurality of data files on a second storage resource, wherein the results include at least one operational parameter of a system.

2. The computer-implemented method of claim 1, further comprising:
generating results based on processing the plurality of files at a headroom interval before expiration of a target time interval after the plurality of files are received from one or more servers; and
using a measure of the headroom interval to control resources allocated to the pipeline of processing stages.

3. The computer-implemented method of claim 1, wherein cross-checking the processing of the plurality of files comprises:
checking a third result of the processing of the plurality of files by receiving a list identifying the plurality of files and checking whether all files of the plurality of files were used in generating the third result of the processing of the plurality of files.

4. The computer-implemented method of claim 1, further comprising:
providing a script-based program to the distributed computing cloud; and
executing, using resources from the distributed computing cloud, the script-based program to perform the analysis of the second plurality of data files.

5. The computer-implemented method of claim 1, wherein the validating is performed using a first portion of data processed by a log module but not a second portion of the data processed by the log module.

6. The computer-implemented method of claim 1, comprising:
resolving the one or more discrepancies by manual intervention and debugging.

7. The computer-implemented method of claim 4, wherein the operational parameter comprises unique instances of content deliveries in the system.

8. The computer-implemented method of claim 1, wherein processing the plurality of files through a pipeline of multiple processing stages comprises:
determining whether all of a plurality of servers from which the plurality of files were received have checked in; and
responsive to determining that all of the plurality of servers from which the plurality of files were received have checked in, releasing messages waiting in one of the processing stages to a next processing stage.

9. The computer-implemented method of claim 1, wherein each file of the plurality of files comprises a plurality of line items.

10. The computer-implemented method of claim 9, wherein each line item of the plurality of line items corresponds to a content delivery instance.

11. The computer-implemented method of claim 10, wherein the content delivery instance comprises a video delivery instance.

12. The computer-implemented method of claim 1, wherein processing the plurality of files through the pipeline of processing stages comprises:
releasing messages waiting in one of the processing stages to a next processing stage when a time period threshold expires.

13. A system, comprising:
a processor configured to:
process, utilizing a first code base, a plurality of files through a pipeline of processing stages, wherein to process the plurality of files the processor is configured to:
control one or more intervening load balancers positioned before a first processing stage of the processing stages to select files from the plurality of files and provide the selected files to the first processing stage;
control storage of the selected files received by the first processing stage to a cloud service;
control storage of output data written by the first processing stage based on the selected files to the cloud service; and
control sharding of processing tasks included in the first processing stage based on partitioning the selected files into at least two logical groups;
cross-check the processing of the plurality of files through the pipeline using a second code base that is different than the first code base utilized to process the plurality of files through the pipeline to validate the processing of the plurality of files through the pipeline using the first code base, wherein the validating comprises determining whether there are one or more discrepancies; and
generate results based on processing the plurality of files at a headroom interval before expiration of a target time interval after the plurality of files are received from a plurality of servers.

14. The system of claim 13, wherein the processor is further configured to:
use a measure of the headroom interval to control resources allocated to the pipeline of processing stages.

15. The system of claim 13, wherein to cross-check the processing of the plurality of files through the pipeline, the processor is further configured to:
check a result of the processing of the plurality of files by receiving a list identifying the plurality of files and checking whether all files of the plurality of files were used in generating the result of the processing of the plurality of files.

16. The system of claim 13, wherein each file of the plurality of files comprises a plurality of line items and each line item of the plurality of line items corresponds to a content delivery instance.

17. The system of claim 16, wherein the content delivery instance comprises demographic or geographic information of a viewer of a delivered ad.

18. A computer program product comprising a computer-readable non-transitory medium having code stored thereon, the code, when executed by one or more processors, causing the one or more processors to implement a method, comprising:
processing, utilizing a first code base, a plurality of files through a pipeline of processing stages, the processing comprising:
responsive to determining that all of a plurality of servers from which the plurality of files were received have checked in, releasing messages waiting in one of the processing stages to a next processing stage;
controlling one or more intervening load balancers positioned before a first processing stage of the processing stages to select files from the plurality of files and provide the selected files to the first processing stage;
controlling storage of the selected files received by the first processing stage to a cloud service;
controlling storage of output data written by the first processing stage based on the selected files to the cloud service; and
controlling sharding of processing tasks included in the first processing stage based on partitioning the selected files into a least two logical groups; and
cross-checking the processing of the plurality of files through the pipeline using a second code base that is different than the first code base utilized to process the plurality of files through the pipeline to validate the processing of the plurality of files through the pipeline using the first code base.

19. The computer program product of claim 18, wherein the method further comprises:
generating results based on processing the plurality of files at a headroom interval before expiration of a target time interval after the plurality of files are received from one or more servers; and
using a measure of the headroom interval to control resources allocated to the pipeline of processing stages.

20. The computer program product of claim 18, wherein the method further comprises:
checking a result of the processing of the plurality of files by receiving a list identifying the plurality of files and checking whether all files of the plurality of files were used in generating the result of the processing of the plurality of files.

* * * * *